L. LEWISON.

APPARATUS FOR THE MANUFACTURE OF ICE CREAM CONES.

APPLICATION FILED JAN. 24, 1921.

Reissued Apr. 4, 1922.

15,327.

5 SHEETS—SHEET 1.

INVENTOR
L. LEWISON
By Thurston Laugh & Co
ATT'YS.

L. LEWISON.

APPARATUS FOR THE MANUFACTURE OF ICE CREAM CONES.

APPLICATION FILED JAN. 24, 1921.

Reissued Apr. 4, 1922.

15,327.

5 SHEETS—SHEET 2.

INVENTOR.
L. LEWISON
By Thurston Haughton
ATT'YS.

L. LEWISON.

APPARATUS FOR THE MANUFACTURE OF ICE CREAM CONES.

APPLICATION FILED JAN. 24, 1921.

Reissued Apr. 4, 1922.

15,327.

5 SHEETS—SHEET 3.

INVENTOR

L. LEWISON

By Delhurton Haugh & Co

ATT'Y'S.

L. LEWISON.
APPARATUS FOR THE MANUFACTURE OF ICE CREAM CONES.
APPLICATION FILED JAN. 24, 1921.
Reissued Apr. 4, 1922.
15,327.
5 SHEETS—SHEET 4.
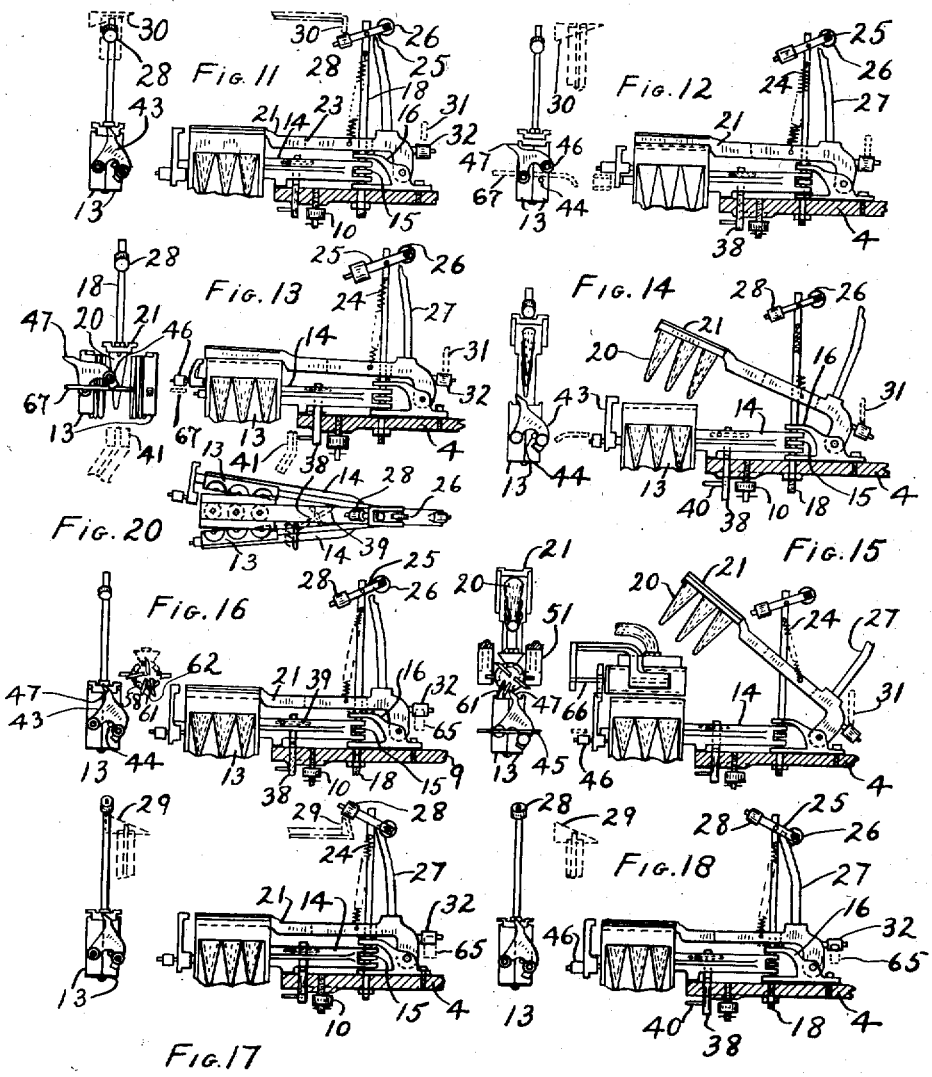
INVENTOR.
L. LEWISON
BY Allerton Laughlin Co
ATT'YS.

L. LEWISON.

APPARATUS FOR THE MANUFACTURE OF ICE CREAM CONES.

APPLICATION FILED JAN. 24, 1921.

Reissued Apr. 4, 1922.

15,327.

5 SHEETS—SHEET 5.

INVENTOR

L. LEWISON

BY Johnston Keegan & Co

ATT'YS.

UNITED STATES PATENT OFFICE.

LEWIS LEWISON, OF HAMILTON, ONTARIO, CANADA, ASSIGNOR, BY MESNE ASSIGNMENTS, TO CONE COMPANY OF AMERICA, OF WILMINGTON, DELAWARE, A CORPORATION OF DELAWARE.

APPARATUS FOR THE MANUFACTURE OF ICE-CREAM CONES.

15,327. Specification of Reissued Letters Patent. Reissued Apr. 4, 1922.

Original No. 1,289,209, dated December 31, 1918, Serial No. 197,502, filed October 19, 1917. Application for reissue filed January 24, 1921. Serial No. 439,703.

*To all whom it may concern:*

Be it known that I, LEWIS LEWISON, of the city of Hamilton, county of Wentworth, Province of Ontario, Canada, have invented certain new and useful Improvements in Apparatus for the Manufacture of Ice-Cream Cones, of which the following is a specification.

This invention relates to apparatus for forming and cooking conical food containers which are themselves edible and particularly to that type in which a series of radially arranged divided molds and cooperating cores are supported on a rotary carrier to which a stepwise movement is given to carry each mold in succession to a filling device, thence through heating devices to a discharging point, suitable means being provided for actuating the feeding device, opening and closing the molds and moving the cores to and from their cooperating position with the molds as necessary in the cycle of operations.

It is my object to devise apparatus of this type which will be rapid and certain, and absolutely automatic in operation, and particularly to devise means for preventing the sticking of pieces of broken cones between the parts of a mold or breaking of a cone in a mold in any way damaging or interfering with the proper operation of the machine if not immediately detected and the trouble remedied.

I attain my objects by means of the constructions hereinafter described and illustrated in the accompanying drawings in which—

Figure 1:
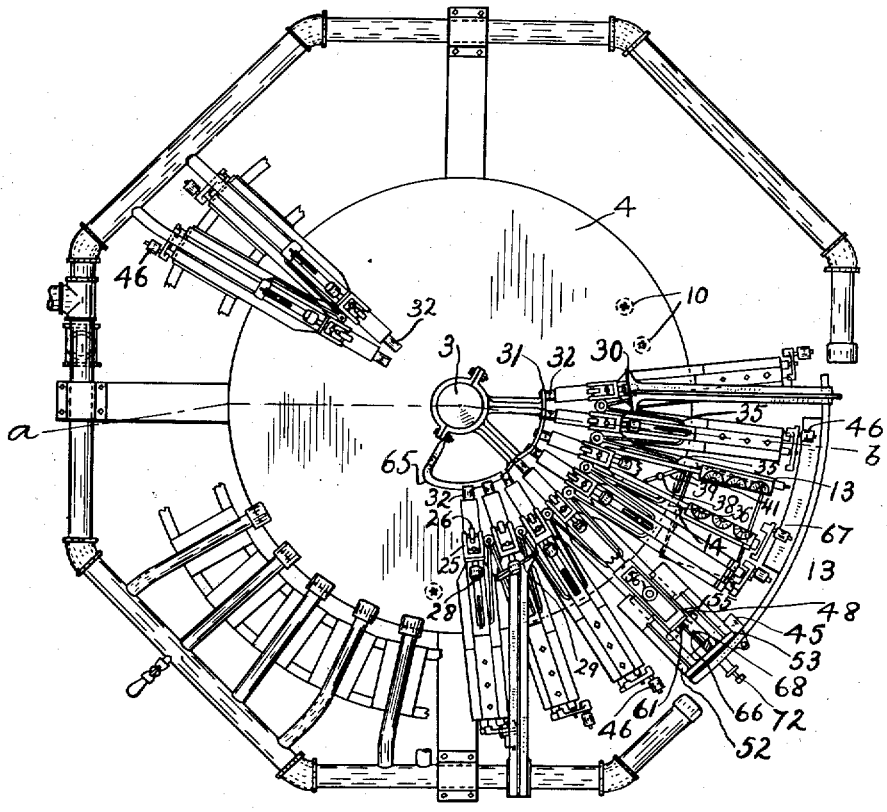
Figure 2:
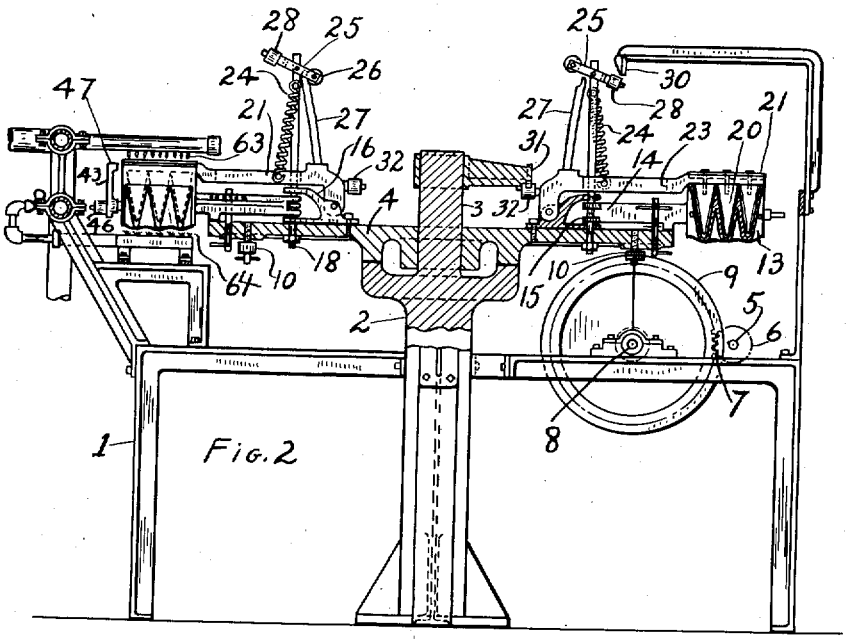
Figure 3:
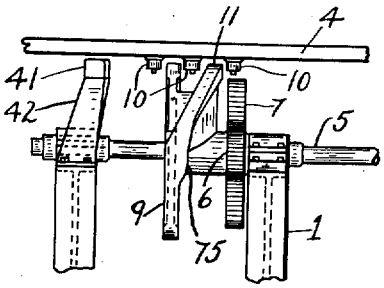
Figure 4:
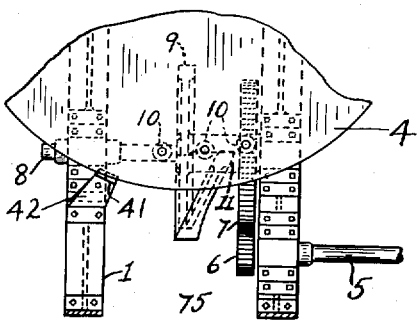
Figure 6:
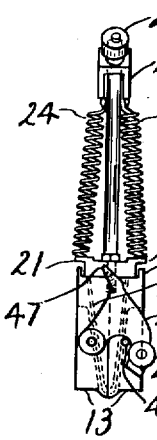
Figure 5:
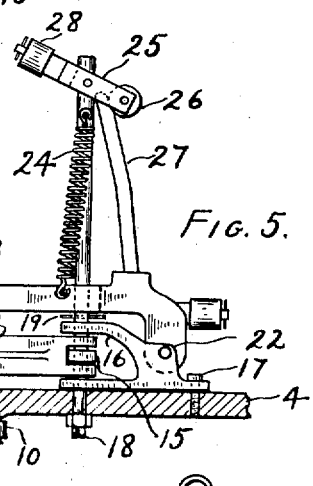
Figure 7:
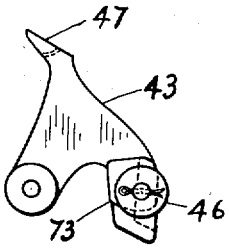
Figure 8:
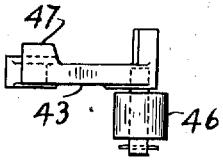
Figure 10:
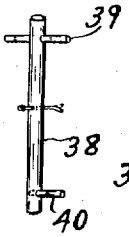
Figure 9:
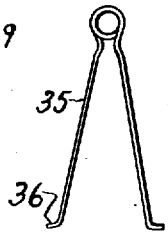
Figures 21, 22, 23, 24, 25, 26, 27, 28, 29, 30, 31, 32, 33, 34, 35:
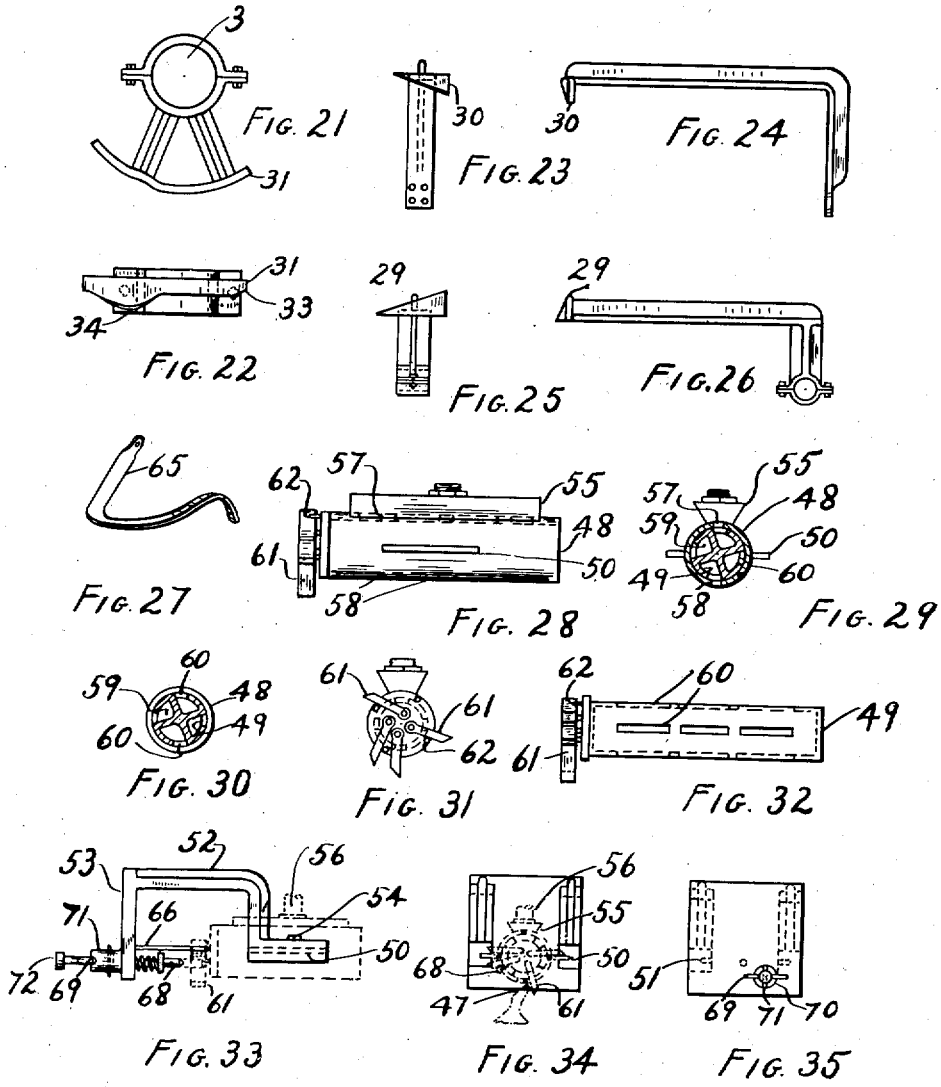

Figure 1 is a plan view of my improved machine, showing only a portion of the molds and cores;

Fig. 2 a vertical section of the same on the line *a—b* in Fig. 1;

Fig. 3 a detail in elevation of the driving mechanism for the rotary carrier;

Fig. 4 a plan view of the same parts;

Fig. 5 a side elevation of a mold and core unit;

Fig. 6 an end elevation of the same;

Fig. 7 a front elevation of the mold lock;

Fig. 8 a plan view of the same;

Fig. 9 a plan view of one of the springs used for closing the molds;

Fig. 10 a perspective detail of the spindle of the mold opening mechanism;

Figs. 11 to 19 are details in front elevation and side elevation showing the molds and cores in different progressive positions;

Fig. 20 a plan view of one of the mold and core units;

Fig. 21 a plan view of the cam controlling the movements of the cores;

Fig. 22 a front elevation of the same;

Fig. 23 a front elevation of the cam for opening the locks for the core arms;

Fig. 24 a side elevation of the same;

Fig. 25 a front elevation of the cam for closing the locks of the core arms;

Fig. 26 a side elevation of the same;

Fig. 27 a perspective detail of the spring which effects the final closure of the cores at the time of locking;

Fig. 28 a side elevation of the batter-feeding mechanism;

Fig. 29 an end elevation of the same partly in section;

Fig. 30 a cross section of the measuring device and valve;

Fig. 31 an end elevation of the batter-measuring device;

Fig. 32 a plan view of the batter-measuring device and valve;

Fig. 33 a detail in side elevation illustrating the means of supporting the batter-feeding device and the device for throwing it out of action;

Fig. 34 an end elevation of the same parts looking from the inner side and

Fig. 35 a similar view looking from the outer side.

In the drawings like numerals of reference indicate corresponding parts in the different figures.

Referring particularly to Figs. 1 to 4, 1 is the frame of the apparatus suitably shaped to support the different parts. Centrally of the frame is formed the standard 2 provided with an upwardly extending journal 3 on which is journaled the rotary carrier 4. Suitable tracks are formed on the standard and carrier respectively concentric with the journal to relieve the strain on the latter and steady the carrier. This carrier supports the series of mold and core units as hereinafter described and is given an intermittent rotary movement by the following mechanism.

On the frame is journaled the driving shaft 5 provided with the pinion 6 meshing with the spur wheel 7 on the shaft 8. On the shaft 8 is secured a worm cam 9. This cam is shaped to engage a series of projections 10 secured to the under side of the carrier and preferably formed as anti-friction rollers. The cam is also figured to hold the rotary carrier stationary for some three-fourths or more of one rotation of the same, the movement taking place solely while the inclined segment 11, which is preferably one-fourth or less of the entire circumference of the cam, is operatively engaging one of the projections thereon.

This segment is for the greater part of its length the same thickness as the rim of the remainder of the cam, but where its inclination merges into the main portion of the rim of the cam it is increased in thickness as shown at 75, so that it substantially fills the space between two projections 10 just as it ceases to move the projection against which it has been acting.

By this arrangement any over movement of the carrier due to momentum is absolutely prevented. With the arrangement described I secure an intermittent rotary movement of the table the periods of rest being long relative to the periods of movement.

Each mold and core unit comprises the following parts. Each mold is formed of a pair of separable sections 13 connected to arms 14 provided at their ends with interengaging hinge knuckles 15. 16 is a yoke-shaped bracket embracing the hinge knuckles (shown particularly in Fig. 5). This bracket is secured to the carrier by means of a screw 17 and also by means of a hinge pin 18 which extends through the jaws of the bracket, through the hinge knuckles 15 and through the carrier, being secured underneath by means of a nut and above the upper jaw of the bracket by a pin 19.

The mold sections are preferably formed with a plurality of mold recesses with which cooperate the cores 20 secured to the core arm 21, which arm is hinged behind the hinge pin 18 on lugs 22 formed on the bracket 16. From this arrangement it follows that by the removal of one screw and a nut, a mold and core unit is quickly and easily removed or replaced whenever necessary. At the same time the arrangement of the yoke-shaped bracket always maintains the parts connected therewith in proper relationship, and the mold arms are as short as possible which tends to prevent them springing. With short and therefore rigid arms, single locks at the free ends are sufficient. With long arms intermediate locks have in some cases been found necessary, which is an objectionable complication if springing of the molds and the formation of fins on the cones is to be presented.

To assist in the proper alinement of the cores and molds, I prefer to continue the hinge pin upwardly as shown and to form the core arm with a slot 23 embracing the hinge pin. The hinge pin also serves for the attachment of one end of one or more counterbalancing springs 24, the other ends of which are secured to the arm 21.

The hinge pins 18 also serve to support the locking levers 25. Each locking lever is preferably forked to embrace the hinge pin to which it is pivoted at its upper end.

One end of each locking lever is provided with a projection 26 preferably formed as a roller adapted to engage in a slight identation formed at the upper end of the arm 27 secured to the core arm. The other end is adapted for engagement by locking or unlocking cams and is also preferably formed as a roller 28. It will be seen that when the locking lever is in the position shown in Figs. 5 and 6 that the cores will be locked in the molds, but that owing to a measure of resiliency in the hinge pin 18 and arm 27 a slight automatic lifting of the cores is possible to relieve any steam pressure which may generate in the molds.

The cam for moving the locking levers to their locking position is indicated at 29 in Figs. 1, 17, 18, 25 and 26. The unlocking cam 30 is shown in Figs. 1, 11, 12, 23 and 24. Each locking lever during its circuit comes alternately into contact with both these cams.

The cores are raised by means of the stationary cam 31, preferably secured to the journal 3. This cam is adapted to engage over projections 32, preferably formed as anti-friction rollers and secured to the heels of the core arms 21 behind their hinges. The cam, as shown particularly in Figs. 21 and 22, is provided with an incline 33 adapted to slightly raise the core arm, followed by a dwell and terminating in a portion 34 adapted to depress an engaging projection and thereafter to allow it to rise. The friction on the cam is, of course, considerably relieved by the action of the counterbalancing springs 24.

The mold sections are normally pressed to the closed position by means of the bent springs 35 which are located between the molds, the springs being provided with outwardly bent ends 36 adapted to enter holes 37 in the adjacent sides of adjacent molds. To open the molds I provide for each mold a vertical spindle 38 journaled on the carrier. Each spindle is provided with projections 39 normally parallel to and received between the arms 14.

On the lower end of each spindle below the carrier is a projection 40, which, when the projection is in the position shown in Fig. 5, lies in the path of the cam 41, (see particularly Figs. 1, 3 and 4.) The arm 42 supporting this cam from the frame work of the machine is preferably somewhat resilient so that the cam will yield if any mold has through accident remained locked, as hereinafter described, at the time it should be opened by the engagement of the projection 40 of its operating spindle with the cam 41.

The mold sections must be firmly tightened together and locked closed during the filling of the molds and the cooking of the cones. It is also very desirable that the locks be so arranged that the mold sections are not forced together in the event of a broken cone or other obstruction remaining between the parts or otherwise the mold sections or closing mechanism might be broken. It is also very important that no batter shall be fed to a mold which has not been properly closed. To accomplish the desired results I provide the following mechanism.

Figure 19:
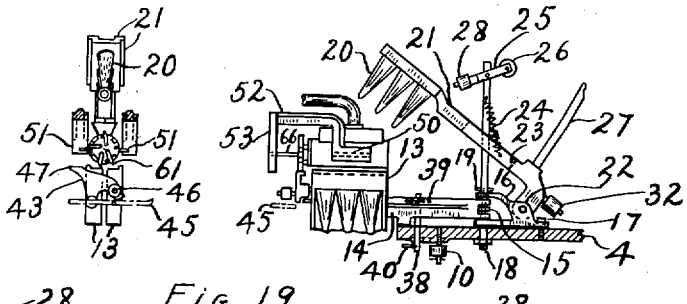

On one section of each mold is pivoted a hook-shaped lock 43 which is adapted to engage over a pin 44 on the co-operating mold section. The hook is so shaped that it will normally tend to fall to the preliminary closing position as shown in Fig. 14, with a slight shoulder 73 resting against the pin 44, requiring the application of force to press the lock to the final closing position and jam the sections closely together. This force is applied through the medium of a stationary cam 45 supported from the frame of the machine in such a position that, as the mold travels toward it, will engage, according to circumstances, either below or above the center of a projection 46 on the lock, preferably formed as an anti-friction roller. If the lock has fallen to the preliminary locking position, as it will if there are no obstructions in the mold, the end of the cam will strike the roller just above the center and draw down the hook, thus tightly jamming the sections of the mold together. If there is any obstruction in the mold, the sections will be held apart, against the tension of the closing springs, and the lock will fail to fall to the preliminary locking position, as shown in Fig. 19, in which case the cam 45 will either strike the roller below the center or pass completely beneath it, so that the lock is not actuated to force the sections together, and thus no breakage of the mold or locking mechanism will occur, due to the parts being forced together with an obstruction between them.

The locks 43 are also used to actuate the batter-feeding device, the projection 47 being formed for that purpose. When a mold is properly locked, this projection occupies the position shown particularly in Figs. 5, 6, 15, and 16, in which position it will engage and operate the batter-feeding device. If the mold be not completely closed, the projection 47 will occupy the position shown in Figs. 12 and 19, in which it will not operate the batter-feeding device as will hereafter appear.

The batter-feeding device comprises a cylindrical casing 48 and the cylindrical batter-measuring device and valve 49 rotatable therein. The casing is provided with a flange 50 at each side adapted to be inserted in the grooved guides 51 formed at the lower end of the inwardly and downwardly projecting arms 52 extending from the support 53 formed on or secured to the frame of the machine. From the support 53 extends the rod 66. With the free end of this rod the valve 49 engages when the batter-measuring device is in the position shown in Fig. 33, the valve being thus held securely in position when the casing is positioned on the guides 51. A set screw 54 is preferably provided for clamping one of the flanges 50 in its grooved guide.

From this arrangement it follows that the batter-feeding device is readily placed in position or removed from the machine and disassembled in a few moments for cleaning purposes.

The casing communicates by means of suitable feed openings with the hopper 55, which hopper is closed and provided with a pipe 56 which may be connected with any suitable source of batter supply.

As a plurality of mold recesses are employed in each mold, a plurality of inlet openings 57 are employed in the top of the valve casing communicating with the hopper and a plurality of discharge openings 58 are provided in the bottom of the casing.

The valve 49 is provided with a plurality of radial pockets 59 arranged in sets, the sets corresponding in number with the number of mold recesses in each mold. Each radial pocket has an opening 60 through the periphery of the valve of less width than the width of the pocket (see particularly Figs. 28, 29, 30, 31 and 32) which causes a proper cut-off of the batter and prevents drip. From this arrangement it follows that the pockets are alternately filled and emptied as the valve is rotated, and as the filling and emptying occur during periods of rest, which are relatively long compared to the periods of movement, ample time is provided for proper filling and complete draining of the radial pockets.

The end of the valve has a plurality of dogs 61, corresponding in number to the radial pockets, pivoted thereon. The movement of each dog in the direction of rotation is, however, limited by the stops 62. When a mold approaches the batter-feeding device, (see Figs. 15 and 16), the projection 47 and its lock, assuming the mold to be properly locked, will engage one of the dogs 61, press it against the stop 62 and then rotate the valve so that by the time the mold comes to a rest, it is immediately below the discharge openings 58 and one of the sets of radial pockets is in position to discharge through the discharge openings of the casing. If the mold is not properly locked, the projection passes by without engaging the proper dog to rotate the valve and no batter is fed, (see Fig. 19). It will be noted particularly on reference to Fig. 6 that each mold section is formed with the lip 73′ extending upwardly from its face at the outer side thereof adjacent the mold recesses. These lips serve to prevent batter spreading out over the sides of the mold and thus forming laterally projecting fins which would prevent the cones dropping through the molds as they open. The core arms 21 above the molds are provided with the laterally extending lips 74 which serve to prevent the burning of any batter forced up between the core arms and the lips 73′.

While the operation of the parts will be readily understood from the foregoing description taken with the drawings, a general outline of the mode of operation setting forth the coordination of the parts will help to a better understanding of the invention.

Assuming a mold to be closed and locked, it is traveling between upper and lower gas jets 63 and 64 arranged and supplied with a combustible mixture in any well known manner. On arriving near the position for the discharge of the baked cones, the locking lever 25 engages and is rocked by the cam 30 this engagement, however, takes place slightly after the projection 32 has engaged the incline 33 of the cam 31. The result is that the core springs up sharply, releasing itself from the baked cones more effectively than if the movement were more gradual. The incline 33 frees the core from the cones in the mold, and at this point the mold sections are unlocked by the engagement of the projections 46 with the stationary cam 67. The sections are now opened up sharply by the rocking of the spindle 38 through the engagement of the projections 40 with the cam 41. As the cones will be held in approximately central position by the slightly disengaged cores, the mold sections readily pull away from the finished cones so that sticking of the cone to one side or the other is prevented. The cones now drop and the core rises up to the position shown in Fig. 14, the intermediate steps being shown in Figs. 12 and 13. At this point the molds and cores are readily accessible for greasing.

The projection 40 now passes the cam 41 and the molds are closed by the springs 35. By this time the projection 46 has passed the cam 67 and the lock 43 is free to fall to its preliminary locking position. At the same time the core is completely swung up owing to the projection on its heel riding down the convex part 34 of the stationary cam 31. The mold is now finally tightened up, locked and filled while the core remains raised. After the mold is filled, the core is lowered owing to the projection on its heel riding up the convex part of the cam 31.

Just as the core is closed the projection 32 is engaged on the under side by the bent spring 65, which has a curved hump formed at its end. This spring, when the hump engages the projection 32, presses the core firmly to the closed position so that the end of the core arm 27 is in a position to be engaged by the projection 26 as the locking lever 25 is moved toward the locking position by its engagement with the cam 29. If there is any obstruction in the mold, the spring yields and the core is not pressed down and is not locked. After passing the hump on the bent spring, the projection 32 does not engage the spring so that the action of the latter on a projection just passing from the stationary cam 31 is not interfered with. Each mold in turn passes through the series of operations just described as long as everything is going well. If, however, any mold becomes obstructed, the safety devices, hereinbefore described come into operation and the machine makes no attempt to close the obstructed mold and no batter is fed thereto. If one of the projections 46 becomes broken after a mold is locked so that its hook 43 does not automatically unlock, still no harm is done to the unlocking device as the cam 41 yields to allow the projection 40 of the mold-opening device to pass by.

It is desirable at times to be able to stop the operation of the batter feeding device, for example, when the molds and cores are being heated up at the beginning of operations. For this purpose I provide the spring-pressed pin 68 slidable through the support 53. The pointed end of this pin, when projected toward the batter-feeding device, is adapted to engage the forward side of any dog 61 which is in position to be engaged by a projection 47 of the lock of a properly locked mold and to push back the dog out of the path of the projection, (see Fig. 33). The stem of the pin has a cross pin 69 passed through it which may be engaged with the end of the tube 70 through which the pin 68 passes to hold the pin back against the pressure of the spring and therefore out of operative position. The tube 70 is cut away at 71 to permit of the pin 68 being projected when the cross pin is brought into alinement with such cut out portions. An operating handle 72 is preferably connected to the pin 68.

From the above description it will be seen that my machine is entirely automatic and requires a minimum of attention, no possibility of serious harm arising from inattention on the part of the operator. One operator therefore can attend to a number of machines. The machine is also conveniently arranged for quick assembly or for replacement of any broken parts.

What I claim as my invention is:

1. In apparatus for the manufacture of ice cream cones, in combination a double short arm fulcrumed at its inner end, and carrying at the outer end separable sections forming a divided mold, the sections of which are adapted to swing horizontally to and from each other, and a comparatively long arm fulcrumed at its inner end radially within the fulcrum of the short arm, extending over the same, adapted to swing in a vertical plane, and carrying a core designed to co-act with the divided mold.

2. In apparatus for the manufacture of ice cream cones in combination a divided mold comprising separable sections located at the outer end of a short arm hinged on a pivot at the inner end, and a co-acting core located at the outer end of a comparatively long arm located longitudinally directly above the short arm and adapted to be moved vertically on a pivot located behind the short arm pivot, means at the inner extremity of the long arm and to the inside of the fulcrum for raising and lowering it, and means located and operating between arms of the sections for moving the sections apart in a horizontal plane.

3. In apparatus for the manufacture of ice cream cones in combination a rotatable carrier, a circle of molding devices carried thereby, and each comprising a divided mold consisting of separable sections located at the outer end of short arms hinged on a pivot at the inner end of a vertical spindle extending between the short arms and carrying projections adapted to engage with arms, means for partially turning the spindle and a co-acting core located on a long arm extending directly above the aforesaid arm.

4. In apparatus for the manufacture of ice cream cones in combination a rotatable carrier, a circle of molding devices carried thereby and each comprising a divided mold consisting of separable sections located at the outer end of short arms hinged on a pivot at the inner end, a vertical spindle extending between the short arms and carrying projections adapted to engage with the short arms, and means for holding the separable sections of the molds together extending directly under the long arm.

5. In apparatus for the manufacture of ice cream cones the combination with a rotary carrier of a mold carried thereby comprising separable sections carried on arms, spring means between the arms for moving the sections together, and means at the ends of the arms for normally locking them when thrown together.

6. In apparatus for the manufacture of ice cream cones the combination with a rotary carrier of a mold carried thereby comprising separable sections carried on arms, means for moving the sections together, and means for normally locking them when thrown together, and another means for preventing them being locked should the sections not contact when thrown together.

7. In apparatus for the manufacture of ice cream cones the combination with a rotary carrier of a mold carried thereby comprising separable sections carried on arms, means for moving the sections together, and means for normally locking them when thrown together, and stationary means for preventing them being locked should the sections not contact when thrown together.

8. In apparatus for the manufacture of ice cream cones the combination with a rotary carrier of a mold carried thereby comprising separable sections carried on arms, means for moving the sections together and means for normally locking them when thrown together, means for preventing them being locked should the sections not contact when thrown together, a batter-feeding device operable by the locking means of the sections of the mold, and means for throwing the batter-feeding device out of commission when the locking means of the section is inoperable.

9. In apparatus for the manufacture of ice cream cones, a rotatable carrier, a series of sets rollers carried circumferentially under the table, a cam adapted to drive the rotary carrier by means of passing from one set of rollers to the succeeding set of rollers, and so formed as to be of the same thickness, except where its inclination merges into the main portion, the rim of the cam where the thickness is increased so as to substantially fill the space between the rollers or projections, just as it ceases to move the projection against which it has been acting whereby any over-movement of the carrier due to momentum is prevented.

10. In apparatus for the manufacture of ice cream cones the combination of a rotatable carrier, a mold formed of a pair of separable sections rigidly connected to arms formed with inter-engaging hinge knuckles, a vertical hinge pin secured to said carrier and extending through said knuckles, a core adapted to co-operate with said mold, and an arm carrying the core hinged on said carrier behind the hinge pin and provided with a slot through which said hinge pin passes, the mold arms being short and the core arms relatively long whereby springing of the mold sections is avoided and an approximately vertical movement of the core while in the mold is obtained.

11. In apparatus for the manufacture of ice cream cones the combination of a rotatable carrier, a mold formed of a pair of separable sections rigidly connected to arms formed with inter-engaging hinge knuckles, a vertical hinge pin secured to said carrier and extending through said knuckles, a core adapted to co-operate with said mold, an arm carrying the core hinged on said carrier behind the hinge pin and provided with a slot through which said hinge pin passes, the mold arms being short and the core arms relatively long whereby springing of the mold sections is avoided and an approximately vertical movement of the core while in the mold is obtained, and a coil spring for counter-balancing the core connected at one end to the hinge pin and at the other end to the arm.

12. In apparatus for the manufacture of ice cream cones the combination of a rotatable carrier, a mold formed of a pair of separable sections rigidly connected to arms formed with inter-engaging hinge knuckles, a yoke-shaped bracket secured to the carrier and embracing said hinge knuckles, a vertical hinge pin secured to said carrier and extending through said knuckles and yoke-shaped bracket, a core adapted to co-operate with said mold, and an arm carrying the core hinged on said bracket behind the hinge pin and provided with a slot through which said hinge pin passes, the mold arms being short and the core arms relatively long whereby springing of the mold sections is avoided and an approximately vertical movement of the core while in the mold is obtained.

13. In apparatus for the manufacture of ice cream cones the combination of a rotatable carrier, a mold formed of a pair of separable sections rigidly connected to arms formed with inter-engaging hinge knuckles, a yoke-shaped bracket secured to the carrier and embracing said hinge knuckles, a vertical hinge pin extending through said knuckles and bracket, a core adapted to co-operate with said mold, and an arm carrying the core hinged on said bracket, the mold arms being short, and the core arms relatively long whereby springing of the mold sections is avoided and an approximately vertical movement of the core while in the mold is obtained.

14. In apparatus for the manufacture of ice cream cones the combination of a rotatable carrier, a mold formed of a pair of separable sections rigidly connected to arms formed with inter-engaging hinge knuckles, a vertical hinge pin secured to said carrier and extending through said knuckles, a core adapted to co-operate with said mold, an arm carrying the core hinged on said carrier and provided with a slot through which said hinge pin passes, the mold arms being short and the core arms relatively long whereby springing of the mold sections is avoided and an approximately vertical movement of the core while in the mold is obtained, a lock arm extending up from the core arm adjacent the hinge pin, a locking lever pivoted intermediate its ends and adapted to engage the lock arm at its upper end, and stationary locking and unlocking cams in the path of said locking lever adapted to actuate the same.

15. In apparatus for the manufacture of ice cream cones the combination of a rotatable carrier, a mold formed of a pair of separable sections rigidly connected to arms hinged on the carrier, a core adapted to co-operate with said mold, an arm carrying the core hinged on said carrier, the mold arms being short and the core arms relatively long whereby springing of the mold sections is avoided and an approximately vertical movement of the core while in the mold is obtained, a vertically extending pin connected to said carrier, a lock arm extending up from the core arm adjacent said pin, a locking lever pivoted intermediate its ends and adapted to engage the lock arm at its upper end, and stationary locking and unlocking cams in the path of said locking lever adapted to actuate the same.

16. In apparatus for the manufacture of ice cream cones the combination of a rotatable carrier, a mold formed of a pair of separable sections connected to arms hinged on the carrier, a core adapted to co-operate with said mold, an arm carrying the core hinged on said carrier, a vertically extending pin connected to said carrier, a lock arm extending up from the core arm adjacent said pin, a locking lever pivoted intermediate its ends and adapted to engage the lock arm at its upper end, stationary locking and unlocking cams in the path of said locking lever adapted to actuate the same, a projection on the core arm extending inwardly beyond its hinge, and a stationary cam in the path of said projection adapted to raise the core from the mold, said cam being adapted to exert a slight lifting pressure before the locking lever is released.

17. In apparatus for the manufacture of ice cream cones the combination of a rotatable carrier, a mold formed of a pair of separable sections connected to arms hinged on the carrier, a core adapted to co-operate with said mold, an arm carrying the core hinged on said carrier, a vertically extending pin connected to said carrier, a lock arm extending up from the core arm adjacent said pin, a locking lever pivoted intermediate its ends on the vertically extending pin and adapted to engage the lock arm at its upper end, stationary locking and unlocking cams in the path of said locking lever adapted to actuate the same, a projection on the core arm extending inwardly beyond its hinge, a stationary cam in the path of said projection adapted to raise the core from the mold and subsequently lower it, and a spring with which said projection engages immediately after the return of the core to its normal position, adapted to press the core into the mold while the locking lever is being moved to its locking position.

18. In apparatus for the manufacture of ice cream cones the combination of a rotatable carrier, a series of radially arranged molds, each mold being formed of a plurality of separable sections connected to arms hinged on said carrier, springs arranged between the molds each engaging adjacent sides of two molds and tending to close the molds, a series of vertical spindles journaled in the carrier between the mold arms, projections on the upper ends of said spindles between the mold arms adapted when the spindles are partially rotated to open the molds, a lower projection on each spindle, and a stationary cam adapted to engage and release each lower projection in turn, as the carrier is rotated to open the molds and thereafter permit them to close by the action of the springs.

19. In apparatus for the manufacture of ice cream cones the combination of a rotatable carrier, a mold formed of a pair of separable sections connected to arms hinged on the carrier to swing horizontally, spring means tending to close the molds, a lock for said sections tending to move to a position to lock them closed, the mold sections being adapted when slightly separated to prevent the lock dropping to the locking position, and a batter feeding device operable by the contact of the mold lock, the mold lock being shaped to engage and operate the batter feeding device only when in locking position.

20. In apparatus for the manufacture of ice cream cones the combination of a rotatable carrier, a mold formed of a pair of separable sections connected to arms hinged on the carrier to swing horizontally, a spring means tending to close the molds, a lock for said sections tending to move to a preliminary locking position, and stationary means engageable by the lock as it moves with the mold, for forcing the lock to a final locking position, said stationary means being positioned and the lock shaped so that the two will operatively engage only when the lock is in its preliminary locking position.

21. In apparatus for the manufacture of ice cream cones the combination of a rotatable carrier, a mold formed of a pair of separable sections connected to arms hinged on the carrier to swing horizontally, spring means tending to close the molds, a lock for said sections tending to move to a preliminary locking position, stationary means engageable by the lock as it moves with the mold, for forcing the lock to a final locking position, said stationary means being positioned and the lock shaped so that the two will operatively engage only when the lock is in its preliminary locking position, and a batter-feeding device operable by the contact of the mold lock, the mold lock being shaped to engage and operate the batter feeding device only when in final locking position.

22. In apparatus for the manufacture of ice cream cones the combination of a rotatable carrier, a mold formed of a pair of separable sections connected to arms hinged on the carrier to swing horizontally, spring means tending to close the molds, a hook-shaped lock pivoted on one mold section, a pin on the other mold section with which the hook may engage, said lock tending to move to a preliminary locking position in engagement with the pin, a projection on said lock, and a stationary cam with which said projection may engage to force the lock to a final locking position, said cam being shaped and positioned to be engaged by said projection only when the lock is in its preliminary locking position.

23. In apparatus for the manufacture of ice cream cones the combination of a rotatable carrier, a mold formed of a pair of separable sections connected to arms hinged on the carrier to swing horizontally, spring means tending to close the molds, a hook-shaped lock pivoted on the end of one mold section, a pin on the other mold section with which the hook may engage, said lock tending to move into contact with the pin, a batter feeding device, and a projection on the lock adapted to engage and operate the batter feeding device, the said projection being so located that it is only in operative position when the lock is in locking position.

24. In apparatus for the manufacture of ice cream cones the combination of a rotatable carrier, a mold formed of a pair of separable sections connected to arms hinged on the carrier to swing horizontally, spring means tending to close the molds, a hook-shaped lock pivoted on one mold section, a pin on the other mold section with which the hook may engage, said lock tending to move to a preliminary locking position in engagement with the pin, a projection on said lock, a stationary cam with which said projection may engage to force the lock to a final locking position, said cam being shaped and positioned to be engaged by said projection only when the lock is in its preliminary locking position, a batter feeding device, and a projection on the lock adapted to engage and operate the batter feeding device, the said projection being so located that it is only in operative position when the lock is in final locking position.

25. In apparatus for the manufacture of ice cream cones the combination of a rotatable carrier, a series of radially arranged molds, each mold being formed of a plurality of separable sections connected to arms hinged on said carrier, springs arranged between the molds each engaging adjacent sides of two molds and tending to close the molds, a series of vertical spindles journaled in the carrier between the mold cams, projections on the upper ends of said spindles between the mold arms adapted when the spindles are partially rotated to open the molds, a lower projection on each spindle, and a stationary cam resiliently supported and adapted to engage and release each lower projection in turn, as the carrier is rotated to open the molds and thereafter permit them to close by the action of the springs.

LEWIS LEWISON.